United States Patent
Haartsen

(10) Patent No.: US 7,650,116 B2
(45) Date of Patent: Jan. 19, 2010

(54) MULTIPLE ACCESS INTERFERENCE CANCELLATION

(75) Inventor: Jacobus Cornelis Haartsen, Hardenberg (NL)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 194 days.

(21) Appl. No.: 10/595,564

(22) PCT Filed: Nov. 28, 2003

(86) PCT No.: PCT/EP03/13677

§ 371 (c)(1),
(2), (4) Date: Apr. 27, 2006

(87) PCT Pub. No.: WO2005/050869

PCT Pub. Date: Jun. 2, 2005

(65) Prior Publication Data

US 2007/0135053 A1    Jun. 14, 2007

(30) Foreign Application Priority Data

Oct. 31, 2003 (WO) .............. PCT/EP03/12163

(51) Int. Cl.
*H04B 1/00* (2006.01)
*H04B 15/00* (2006.01)

(52) U.S. Cl. ............... 455/63.1; 455/101; 455/63.4; 455/67.13; 455/500; 455/501; 455/561; 455/562.1; 455/226.1; 455/226.2; 455/226.3; 455/296; 375/346; 375/347; 375/348; 375/349; 375/350

(58) Field of Classification Search ........... 455/101, 455/63.1, 63.4, 67.13, 500, 501, 561, 562.1, 455/226.1, 226.2, 226.3, 296; 375/346, 347, 375/348, 349, 350

See application file for complete search history.

(56) References Cited

U.S. PATENT DOCUMENTS 6,052,421 A * 4/2000 Richardson et al. ......... 375/346

(Continued)

FOREIGN PATENT DOCUMENTS

EP    0 849 888 A    6/1998

(Continued)

OTHER PUBLICATIONS

Jong Won Park et al: Multiuser Detection Scheme Using Adaptive Antenna Array Over Rayleigh Fading Channels' VTC 2000-Spring. 2000 IEEE 51$^{st}$. Vehicular Technology Conference Proceedings. Tokyo, Japan. May 15-18, 2000IEEE Vehicular Technolgy Conference, New York NY: IEEE. US. vol. 3 of 3 Conf. 51, May 15, 2000. pp. 2157-2161. XP000968386 ISBN: 0-7803-5719-1 abstract paragraph 'III,! figures 1.2.

(Continued)

*Primary Examiner*—Lana N Le
*Assistant Examiner*—Ping Y Hsieh

(57) ABSTRACT

Method and device for interference cancellation. A radio access unit comprises a plurality of directionally separated antenna elements ($41_k$, K=1, 2, . . . , L) for receiving signals transmitted by a plurality of remote units. From signals received by each of the antenna elements ($41_k$) first weighing factors ($g(1)_k$) are determined (49), for optimally selecting signal of a first remote unit ($52_1$). A first radio signal ($s_1$) of the first communication unit ($52_1$) is provided by weighing (44) the received signals using the first weighing factors ($g(1)_k$). For a further radio communication unit ($52_i$) further weighing factors (g(i)k) are determined. A corrected further radio signal ($s'_i$) is provided each time by subtracting (46) from the further radio signal ($s_i$), previously obtained corrected radio signal ($S'_{i-1}$, $S'_{i-1}$, . . . ) weighed by the further weighing factors ($g(i)_k$), till a stop criterium has been satisfied.

18 Claims, 5 Drawing Sheets

U.S. PATENT DOCUMENTS

| | | | |
|---|---|---|---|
| 6,937,879 B2 * | 8/2005 | Mesecher et al. | 455/561 |
| 7,010,277 B1 * | 3/2006 | Andre et al. | 455/114.2 |
| 7,016,437 B2 * | 3/2006 | Denno | 375/346 |
| 7,248,879 B1 * | 7/2007 | Walton et al. | 455/452.2 |
| 2004/0077377 A1 * | 4/2004 | Kao | 455/562.1 |

FOREIGN PATENT DOCUMENTS

| | | |
|---|---|---|
| EP | 1 267 497 A | 12/2002 |

OTHER PUBLICATIONS

Godara L C: "Adaptive Postbeamformer Interference Canceler With Improved Performance in the Presence of Broadband Directional Sources" Journal of the Acoustical Society of America. American Institute of Physics. New York, US. vol. 89. No. 1, 1991, pp. 266-273. XP000178910 ISSN: 001-4966 abstract paragraphs .001.!. OII.! figures 1. 2.

* cited by examiner

MULTIPLE ACCESS INTERFERENCE CANCELLATION

FIELD OF THE INVENTION

The present invention relates generally to wireless radio communication systems and, more specifically, to signal processing in the radio access units or base stations of wireless radio communication systems for interference cancellation.

BACKGROUND OF THE INVENTION

In the last decades, progress in radio and VLSI (Very Large Scale Integration) technology has fostered widespread use of radio communications in consumer applications. Portable devices, such as portable radios, mobile radio communication units, and the like can now be produced having acceptable costs, size and power consumption.

Mobile telephone communications for the consumer market started with cellular telephone systems derived from the police and rescue services, based on an analog technology improved and optimized in the seventies and eighties. Examples of these early analog mobile telephone systems are indicated by the acronyms NMT and TACS.

Typically, cellular communication systems comprise a plurality of mobile or portable radio communication units and a plurality of radio access units or base stations. Each access unit provides a number of radio communication channels to a geographically limited area, called a communication cell, defined by the operating ranges of a particular radio access unit. The radio access units connect to a central interface unit, also called Radio Exchange (RE) or Mobile Telephone Switching Office (MTSO). The RE or MTSO, in turn, connects to a Public Switched Telephone Network (PSTN) or Integrated Services Digital Network (ISDN) for completing calls between mobile radio users and landline subscribers. A call of a mobile radio user is handed over from cell to cell while the user moves in the coverage area of the radio communication system.

The usage of cellular mobile telephones really took off in the nineties, by the introduction of mobile telephone systems based on digital technology, known under the acronyms GSM, D-AMPS (US-TDMA or IS-136), IS-95 and PDC. Extensions to GSM (also to be applied in D-AMPS) like EDGE have been introduced to improve the data rate on the digital air interfaces.

Generally, the analog systems are indicated as being the first generation, whereas the digital systems are indicated as second generation. Recently, third generation cellular systems have been developed, indicated by the acronyms UMTS, IMT-2000, CDMA2000, featuring larger transmission bandwidths.

While deploying the different systems, extensive work has been carried out to increase the capacity of the systems. Since licensed RF spectrum is in use, the more users the operator can accommodate per MHz-bandwidth, the more efficient he uses his precious and scarce resources, thereby improving his revenues.

A known method of increasing transmission capacity is by applying directional antennas. Early radio communication systems already applied the technique of sectorization, wherein a communication cell is divided into segments of 60 or 120 degrees, each segment covered by a directional antenna beam. In principle, this relates to cell splitting with the nice advantage that no additional radio access sites have to be built: one omni-directional antenna of a communication cell is replaced by six or three directional antennas mounted on the same site installation.

More advanced systems make use of radio access units having adaptive or smart antennas, which can steer the antenna beam towards the mobile user. As the mobile radio user moves, a tracking mechanism is applied in order to keep the beam pointing towards the mobile user. In addition to pointing the beam to the desired user, nulls can be steered towards interfering users such that their signals are greatly suppressed by the antenna diagram. However, when the angle of arrival between the intended and interfering signal is rather small, no optimal setting can be found.

In other cellular communication systems, extensive use is made of adaptive antennas. The capacity of a cellular telephone system is greatly improved by applying Space Division Multiple Access (SDMA). In SDMA, the communication channel is formed by a fixed geographical area: only from this area, signals can arrive.

In advanced cellular systems, adaptive antennas are used the antenna patterns of which can be updated dynamically to define the area covered. In this case, the geographical area is not fixed, but depends on the mobile user position relative to the base station position.

Other mechanisms applied to increase the capacity comprise joint demodulation. By demodulating interferers and taking them into account while demodulating the desired signal, the demodulation can be greatly improved. Because the system can then operate under lower SNR conditions, the capacity of the system increases.

SUMMARY OF THE INVENTION

It is the object of the present intention to improve interference cancellation in a radio communication system, wherein joint demodulation is applied in radio access units using adaptive antennas.

According to the invention, in a first aspect thereof, there is provided a method of interference cancellation in radio communication signals received by a radio access unit of a radio communication system. The antenna means comprise a plurality of directionally separated antenna elements for adaptively receiving radio communication signals transmitted by a plurality of remote radio communication units. The method comprises the steps of:

a) obtaining radio signals received by each of the antenna elements;

b) determining first weighing factors for optimally selecting radio signals of a first radio communication unit among the radio signals obtained in step a);

c) weighing the radio signals obtained in step a) by the first weighing factors providing a first radio signal of the first radio communication unit;

d) determining second weighing factors for optimally selecting radio signals of a second radio communication unit among the radio signals obtained in step a);

e) weighing the radio signals obtained in step a) by the second weighing factors providing a second radio signal of the second radio communication unit;

f) subtracting from the second radio signal provided in step e) the first radio signal provided in step c) weighed by the second weighing factors, providing a corrected second radio signal, and g) repeating steps d) to f) for a further radio communication unit by determining further weighing factors, providing a further radio signal of the further radio communication unit and providing a corrected further radio signal by each time subtracting from the further radio signal the previously obtained corrected radio signals weighed by the further weighing factors, till a stop criterium has been satisfied.

The invention is based on successively removing interferers from the total received signal, which is also denoted as subtractive cancellation. In accordance with the invention, among the radio signals received by the antenna elements, a first radio signal corresponding to a first radio communication unit is determined using first weighing factors associated with the first radio communication unit.

Next, the radio signal of a second radio communication unit is provided, using second weighing factors associated with the second radio communication unit. However, since the first radio signal is known, part of the first radio signal included as interference in the second radio signal can now be removed from the second radio signal by weighing the first radio signal with the second weighing factors and subtracting the weighed result from the second radio signal, resulting in a corrected second radio signal.

By repeating the steps for a third radio communication unit using third weighing factors for obtaining a third radio signal from the total received radio signal, part of the first and second radio signals included as interference in the third radio signal can be removed by weighing the first radio signal and the corrected second radio signal using the third weighing factors and subtracting the weighed result from the third radio signal leaving a corrected third radio signal, and so on. The above steps can be repeated till a stop criterium has been met.

In accordance with a further embodiment of the invention, the stop criterium includes stopping of step g) once a corrected radio signal has been provided corresponding to a radio communication unit of interest.

However, if sufficient signal processing capacity and/or time are available, in accordance with a further embodiment of the invention, the stop criterium includes repetition of step g) for the first, second and further radio communication units till the interference cancellation in the first, second and further radio signals between successive repetitions of step g) drops below a set value.

That is, the signal processing is iterated several times, including provision of a corrected first radio signal by subtracting the interference parts of all the other radio signals properly weighed by the first weighing factors, till no improvement or no significant improvement determined by a set signal quality criterium or value is found. Proper quality criteria or values are known to the skilled person and may depend on the nature of the signals to be processed.

In a yet further embodiment of the invention, the stop criterium includes repetition of step g) during a set time period. This method can be used in combination with the previously disclosed stop method and is useful while processing speech signals, for example, for which strict time delay criteria have to be met.

The weighing factors, in accordance with an embodiment of the invention, are determined by forming conceptual antenna patterns with the plurality of directionally separated antenna elements. That is, the weighing factors are set such that an antenna pattern is formed pointing to a respective radio communication unit or covering the geographical area in which the radio communication unit is located. Note that no "mechanical" or actual beam forming, by controlling the antenna elements, is performed for selectively receiving the radio signal of a respective radio communication unit.

In an embodiment of the invention, the weighing factors are selected for optimally selecting radio signals of a respective radio communication unit and for optimally suppressing radio signals corresponding to any other radio communication unit. In antenna terms, the antenna pattern is constructed thus that the main beam points towards the respective communication unit, and radio signals of other communication units are suppressed as best as possible (null steering).

In a preferred embodiment of the invention, the radio signals obtained in step a) are ordered from strongest to weakest according to receive signal strength, and wherein the first, second and further radio communication units are selected in descending order of receive signal strength. That is, first the strongest radio signal is considered, next the second strongest, and so on till the weakest signal, if applicable.

Those skilled in the art will appreciate that, in general, the strongest radio signal will provide the greatest amount of interference in all the other radio signals. By first removing this source of interference, a first significant improvement will be achieved. Further less significant improvements will than be provided in next iteration steps, if applicable.

In a still further embodiment of the method according to the invention, the first, second and further corrected radio signals are demodulated into first, second and further demodulated signals, respectively, and stored in storage means. For providing the corrected radio signals the demodulated signals are than reconstructed into corresponding radio signals and weighed by the respective weighing factors and subtracted from the respective radio signal, for providing the corrected radio signal. The advantage of this embodiment is that the respective corrected radio signals need not to be stored but that the demodulated signals are used, which anyhow are required for communication purposes.

The method according to the invention is advantageously implemented in the digital domain, wherein the radio signals obtained in step a) are digitized and the steps b) to d) are performed in the digital domain by digital signal processing means. Also the demodulation and reconstruction may be advantageously performed in the digital domain by digital signal processing means.

In a further aspect of the invention there is provided a signal processing device for interference cancellation in radio communication signals received by a radio access unit of a radio communication system, wherein the radio access unit comprising receiver means and antenna means, the antenna means having a plurality of directionally separated antenna elements for adaptively receiving radio communication signals transmitted by a plurality of remote radio communication units, the device comprising:

means for storing radio signals received by each of the antenna elements;

means for determining respective weighing factors for optimally selecting radio signals of a respective radio communication unit among the stored radio signals;

means for weighing the stored radio signals by the respective weighing factors for providing a respective radio signal of the respective radio communication unit; and means for subtracting from the respective radio signal previously determined corrected radio signals of radio communication units weighed by the respective weighing factors, for providing a corrected respective radio signal.

In a further embodiment of the invention, the means for determining respective weighing factors are arranged for forming conceptual antenna patterns with the plurality of directionally separated antenna elements. Preferably, the means for determining the respective weighing factors are arranged for optimally selecting radio signals of a respective radio communication unit and for optimally suppressing radio signals corresponding to any other radio communication unit.

In the preferred embodiment of the invention, the device comprises means for measuring signal strength of the stored radio signals, and means for ordering stored radio signals from strongest to weakest according to receive signal strength, and control means for processing the ordered radio signals in descending order of receive signal strength.

In another embodiment of the invention, the device comprises means for demodulating the respective corrected radio signals, further means for storing the demodulated signals, and means for reconstructing the demodulated signals providing corrected radio signals for weighing by the weighing means.

Means arranged for stopping signal processing in accordance with a stopping criterium may be arranged for stopping the signal processing:
- once a corrected radio signal has been provided corresponding to a radio communication unit of interest,
- till the interference cancellation between successive repetitions of providing a corrected respective radio signal drops below a set value, or
- after a set time period has lapsed.

Preferably, in a yet further embodiment of the invention, the signal processing device comprises analog to digital conversion means for digitizing the stored radio signals, and wherein the processing means are digital signal processing means. Demodulation means and reconstruction means, if applicable, are also advantageously implemented in the digital domain by digital signal processing means.

In a third aspect of the invention, there is provided a radio access unit for use in a radio communication system, the radio communication system comprising a plurality of remote radio communication units and at least one radio access unit, the radio access unit comprising a signal processing device disclosed above.

In a fourth aspect, the invention relates to a radio communication system, comprising a plurality of remote radio communication units and at least one radio access unit as disclosed above.

The above-mentioned and other features and advantages of the invention are illustrated in the following description with reference to the enclosed drawings.

DETAILED DESCRIPTION OF THE EMBODIMENTS

Figure 1:
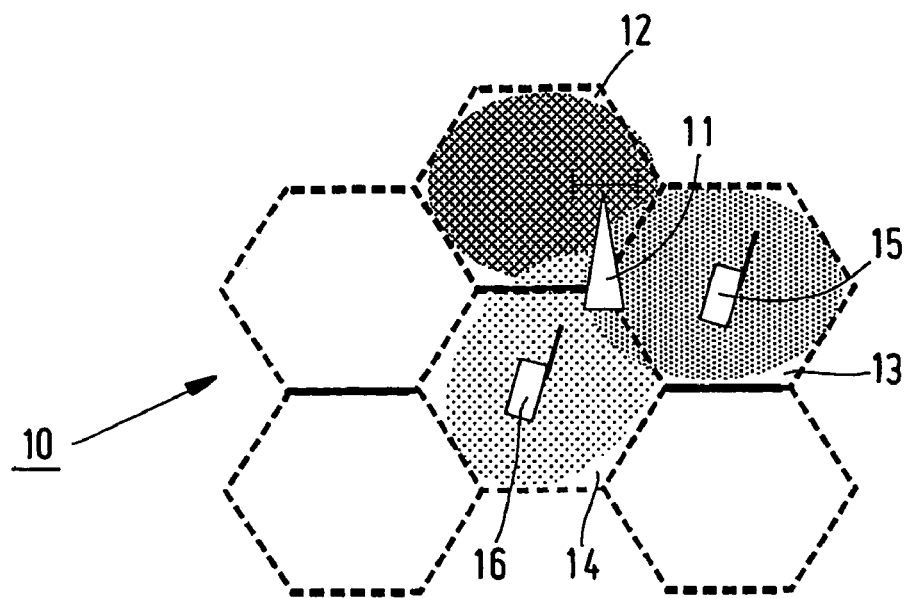
FIG. 1 shows, in a schematic and illustrative manner, a prior art sectorized system with fixed directional antennas covering 120-degrees segments.

FIG. 1 shows a traditional, prior art cellular mobile radio communication system 10, comprising a base station or radio access unit site 11, depicted in the form of an antenna, providing radio coverage to a plurality of cells 12, 13 and 14. The radio coverage is indicated by a respective shading of the cells 12, 13 and 14. The system 10 is an example of a 120-degree sectorized radio coverage system. Mobile users or subscribers 15, 16 travelling in one of the cells 12, 13, 14, with their radio communication unit, will be in radio contact with the radio access unit 11.

Figure 2:
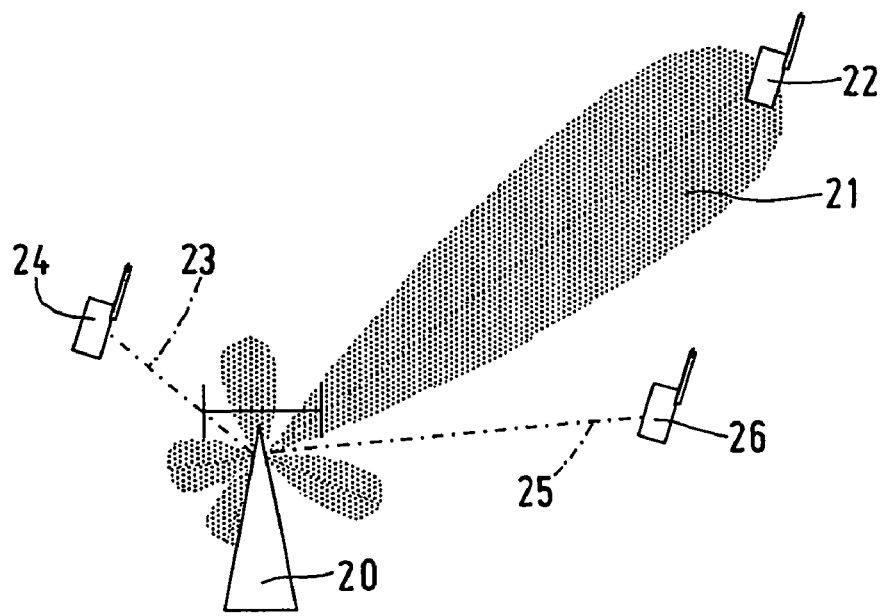
FIG. 2 shows, in a schematic and illustrative manner, a prior art method of beam steering with adaptive antennas.

More advanced radio systems, as shown in FIG. 2, make use of adaptive or smart antennas 20 which can steer the antenna beam 21 towards a mobile user 22. As the user moves, a tracking mechanism is applied in order to keep the antenna beam 21 pointing towards the mobile user 22. In addition to pointing the antenna beam 21 to the desired user 22, nulls 23, 25 can be steered towards interfering users 24, 26 respectively, such that their radio signals are greatly suppressed by the antenna characteristics.

Figure 3:
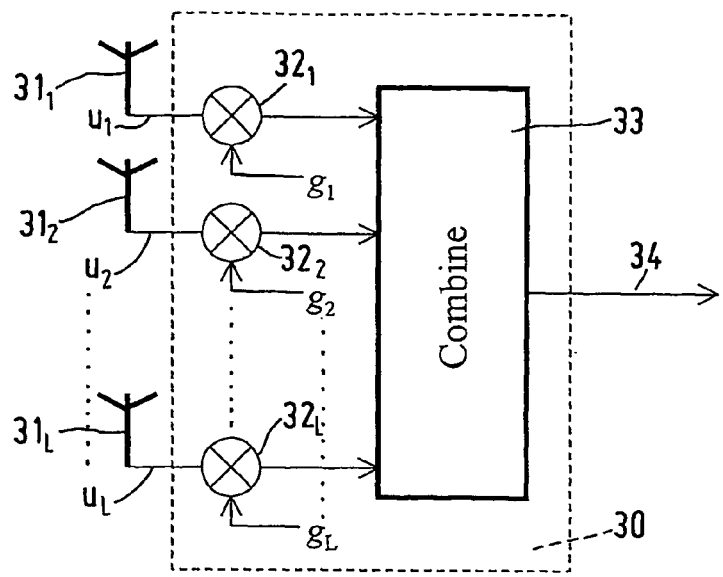
FIG. 3 shows, in a schematic and illustrative manner, prior art schematics of an adaptive antenna with antenna weights.

In FIG. 3, the basic structure of an adaptive antenna 30 is shown. The antenna 30 consists of a number of L directionally separated antenna elements $31_k$, k=1, 2, ..., L. The outputs of these antenna elements $31_k$ are fed into digital signal processing means $32_k$, 33 where complex weights $g_k$, are attributed to the antenna element radio signals $u_k$. By a proper choice of the complex weighing parameters $g_k$, various antenna patterns can be set that favour the signal from an intended radio communication unit of a mobile user and suppress the signals from the interfering radio communication units. An antenna with L elements 31 only has L−1 degrees of freedom. The total number of antenna beams and nulls is limited to L−1. However, suppression may not result in complete removal of such interfering signals. In addition, when the angle of arrival between the intended and interfering signal is rather small, no optimal setting can be found.

With the present invention, the interferers are further suppressed by joint demodulation. For explaining the successive cancellation of interferers according to a preferred embodiment of the present invention, reference is now made to the structure of FIG. 4.

Figure 5:
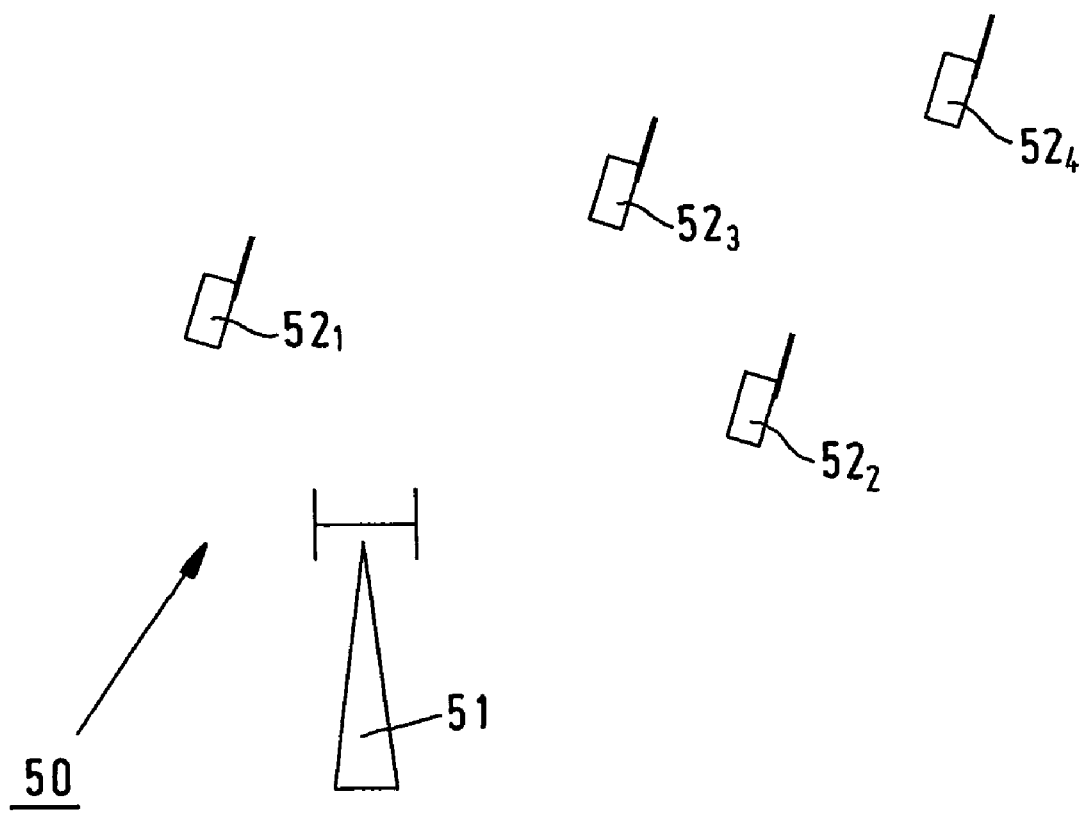
FIG. 5 shows, in a schematic and illustrative manner, an example of a radio communication system, comprising a single radio access unit or base station and four radio communication units or mobile users, arranged in accordance with the present invention.

Unit 40 is a digital processing unit containing various means for performing signal processing in the digital domain and is located in or with a radio access unit 51 of a radio communication system 50, as disclosed in FIG. 5. Note that elements in the RF domain like receivers, transmitters, amplifiers, filters, mixers, analog-to digital converters, etc. have not been specifically depicted but are included by default, as will be appreciated by those skilled in the art.

Assume, as an example, the four user scenario shown in FIG. 5. The radio communication units $52_i$, i=1, 2, 3, 4 are ordered and numbered according to the signal strength received at a radio access unit, from strongest to weakest, according to receive signal strength measured by receive signal strength measurement means 43. The strongest user 1 comprises radio communication unit $52_1$, the second strongest user 2 comprises radio communication unit $52_2$, etc., and user 4 transmitting the weakest signal, viewed at the radio access unit 50, comprises radio communication unit $52_4$. There is one intended mobile user, say user 3, having radio communication unit $52_3$, and three interfering users 1, 2 and 4. Instead of separate measurement means 43, signal strength measurement may also be applied or implemented in control means 49.

First, the radio signals $u_k$, k=1, 2, ..., L of all antenna elements $41_k$ are stored in signal memory means 42. Then, the antenna element radio signals $u_k$ are successively demodulated, strongest to weakest, by demodulator means 45. Next, by control means 49, first weighing factors $g_k(1)$ for the strongest user 1 are calculated and provided by the control means 49 to signal weighing means 44. These first weighing factors $g_k(1)$ represent a conceptual antenna pattern with a main beam towards user 1 and all other users 2, 3 and 4 being suppressed as good as possible. Then the antenna element radio signals $u_k$ are weighed by the first weighing factors $g_k(1)$ in the signal weighing means 44, which results in a first radio signal $s_1$ of the first radio communication unit $52_1$.

For user 1 currently, there are no signals to subtract yet in the subtraction means 46, and the first radio signal $s_1$ of user 1 is demodulated by the demodulation means 45. The first demodulated signal $d_1$ for user 1 is provided at output 39 of the unit 40 and is stored in signal reconstruction means 47, comprising further memory means 48.

The next strongest user is user 2. New, second weighing factors $g_k(2)$ are determined by the control block 49 and implemented in the signal weighing means 44. The weighing factors are also fed to the signal reconstruction means 47. These second weighing factors represent a conceptual antenna pattern with a main beam towards user 2 and all other users 1, 3 and 4 being suppressed as good as possible. Then the antenna element radio signals $u_k$ are weighed in the signal weighing means 44 by the second weighing factors $g_k(2)$, which results in a second radio signal $s_2$ of the second radio communication unit $52_2$.

However, using the second weighing factors $g_k(2)$, the signal reconstruction means 47 can now determine what the contribution of user 1 will be to the second radio signal $s_2$, by applying the second weighing factors $g_k(2)$ on the reconstructed first demodulated radio signal $d_1$, i.e. the first radio signal $s_1$. Note that the first radio signal $s_1$ is available from the further memory means 48.

This contribution of user 1 is now subtracted 46 from the second radio signal $s_2$ resulting in a corrected second radio signal $s'_2$ at the output of the subtraction means 46. The "cleaned" signal is then demodulated by the demodulation means 45, resulting in a demodulated signal $d_2$, provided at the output 39 of the unit 40. The demodulation of user 2 is now more accurate since the interference from user 1 is removed. The demodulated signal $d_2$ from user 2 is stored in the further memory means 48 of the signal reconstruction means 47.

Next, the desired user 3 is considered. Proper third weighing factors $g_k(3)$ are determined by the control means 49 such that these third weighing factors represent a conceptual antenna pattern with a main beam towards user 3 and all other users 1, 2 and 4 being suppressed as good as possible, and fed to the signal weighing means 44 and the signal reconstruction means 47. In the signal weighing means 44 the total signal of the antenna elements $41_k$ is weighted to favour user 3, resulting in the third radio signal $s_3$. Now the demodulated signals $d_1$ and $d_2$ of users 1 and 2 are reconstructed assuming the third weighing factors $g_k(3)$. The signal to be removed is the accumulation from the reconstructed signals from users 1 and 2. This interfering signal is removed from the total signal, resulting in a corrected third radio signal $s'_3$ and is demodulated by the demodulation means 45, resulting in the intended demodulated user signal $d_3$ at the output 39 of the unit 40.

Figure 6A:
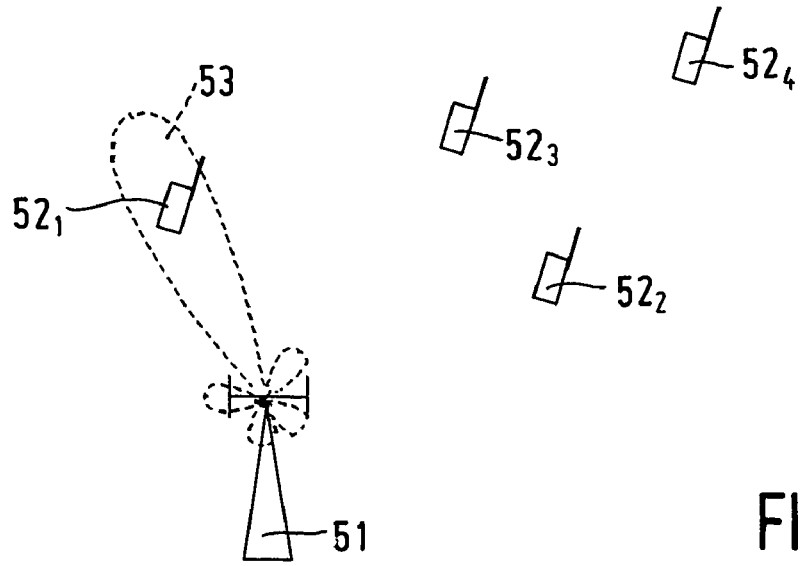
FIGS. 6a, 6b and 6c show, in a schematic and illustrative manner, antenna patterns corresponding to selected weighing factors for a respective radio communication unit in the system of FIG. 5.
Figure 6B:
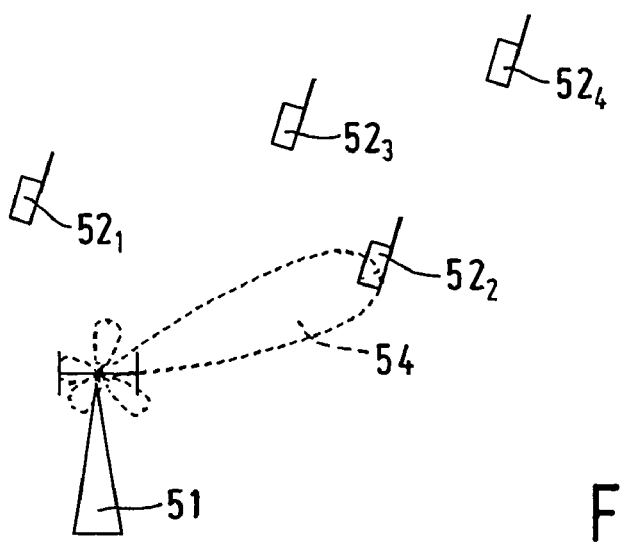
Figure 6C:
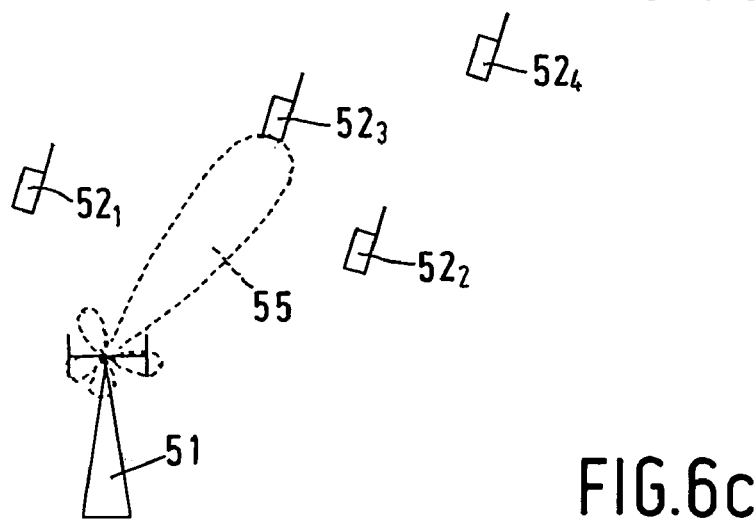

FIG. 6a, FIG. 6b and FIG. 6c, schematically show how the effective or conceptual antenna patterns 53, 54 and 55 for $g_k(1)$, $g_k(2)$ and $g_k(3)$, respectively, look like. Note that the patterns in FIGS. 6a, 6b and 6c are not physically implemented, but would result from the weight settings $g_k(i)$ in the digital processing unit 40.

Since the intended user 3 has been demodulated, the procedure could stop here. However, for more accurate detection, the procedure can continue. First, the last interferer user 4 (although weaker) can be demodulated, with new weights $g_k(4)$ but further the same signal processing as disclosed above. Then, the successive procedure can start all over again. Again $g_k(1)$ can be applied, which may be updated if after the demodulation process more accurate results have been obtained. But now, the contributions of the (weaker but still interfering) users 2, 3 and 4 can be removed before the signal of user 1 is demodulated by the demodulation means 45, rendering an even better estimate of the user 1 signal. The process can continue for user 2 with removing the contributions from users 1, 3 and 4, etc. This procedure can iterate for several times until no noticeable improvements are made.

Figure 7:
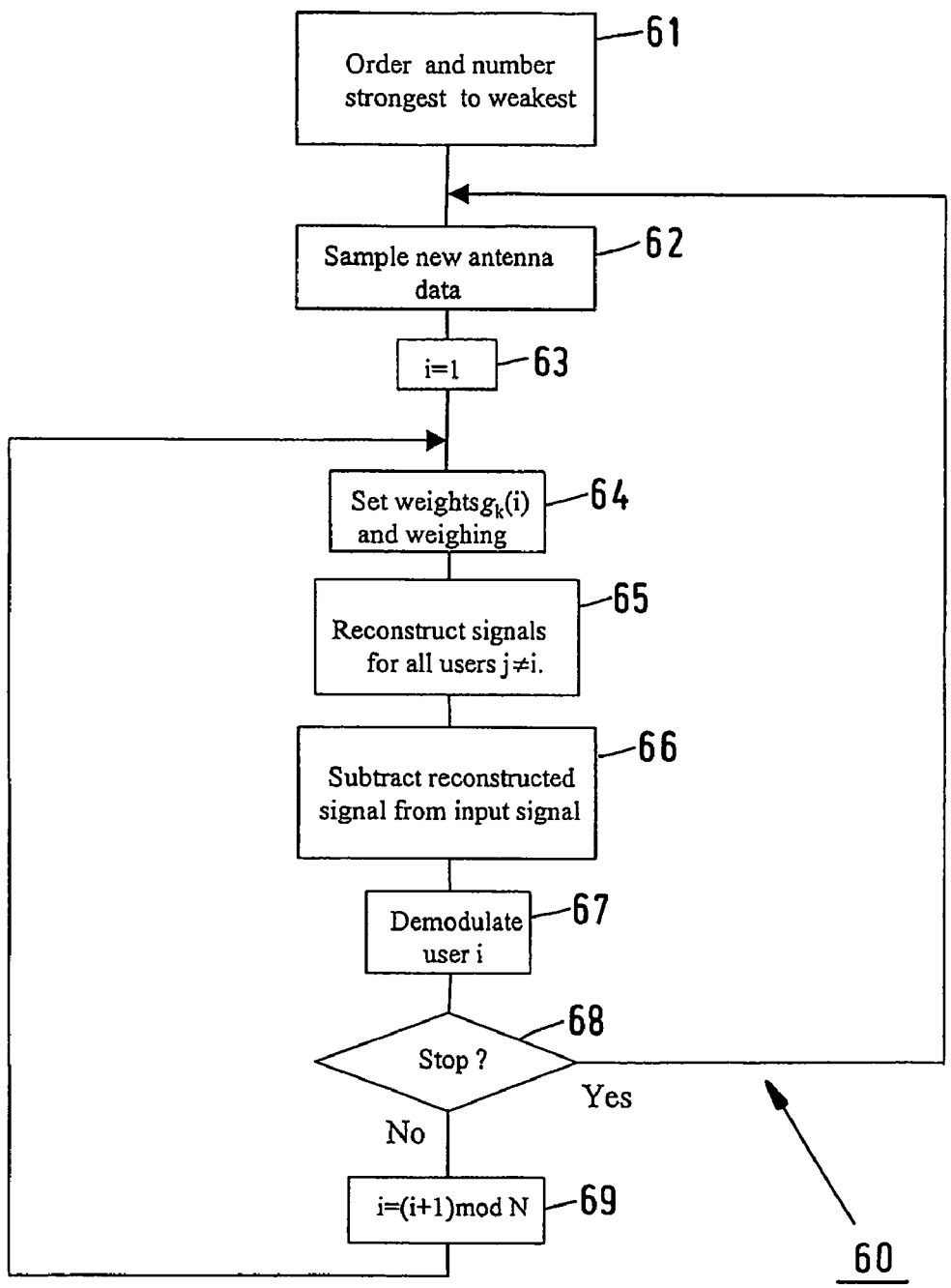
FIG. 7 shows a flow diagram of a preferred embodiment of the interference cancellation method according to the present invention.

The entire procedure of subtractive cancellation for SDMA in accordance with the present invention as disclosed above, is illustrated by the flow chart diagram 60 in FIG. 7. The normal flow is from top to bottom. Here, N users are assumed.

First, in block 61, the obtained radio signals are ordered from strongest to weakest. If available, new antenna data as to the tracking of mobile radio communication are acquired in block 62. For the strongest user, user i=1, block 63, initially the first weighing factors $g_k(1)$ are retrieved and applied in block 64 to the antenna signals obtained, resulting in the first radio signal $s_1$. This first radio signal is directly demodulated, $d_1$, and stored in block 67. This, because initially there are no signals available for correction.

Next, block 69, i=(i+1) mod N results in i=2, and the steps in block 64 will be applied for user 2, using second weighing factors $g_k(2)$ which results in the second radio signal $s_2$. Now, in block 65, the demodulated first radio signal $d_1$ will be reconstructed and weighed by the second weighing factors for subtraction 66 from the second radio signal $s_2$. This results in a corrected second radio signal $s'_2$ for the second user or second radio communication unit. The corrected second radio signal $s'_2$ is demodulated, block 67, providing the demodulated second signal $d_2$, and stored.

The process is continued for i=3, ..., N, until the conditions for "stop", block 68, have been satisfied. These can be, among others:
 the desired user has been demodulated once;
 the desired user has been detected with sufficient accuracy;
 processing time has expired to continue the iteration process.

Figure 4:
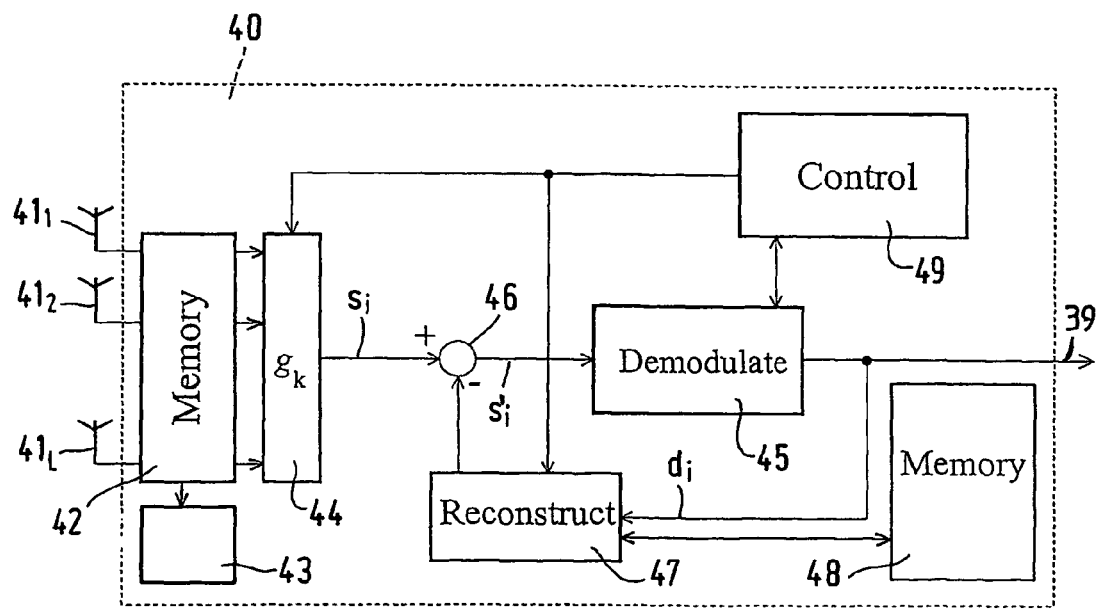
FIG. 4 shows, in a schematic and illustrative manner, an embodiment of a signal processing device according to the present invention.

Notice, that this is all digital signal processing, carried out "off line" on the signals stored in the input memory 42 (FIG. 4). With high-speed processors, this can all be carried out at fast rates. The processed signal part that is demodulated at once can be a symbol, a sequence of symbols, an entire frame, or a number of frames of a radio signal.

Although in the above the first, second, and further corrected radio signals have been demodulated by demodulation means 45, this demodulation step need not necessarily be carried out in the signal processing unit 40 for applying the present invention. When storing the weighed radio signals, the reconstruction means may be omitted and the corrected signals $s'_1$ are stored directly in the further memory means 48.

Those skilled in the art are aware of how to build or program digital signal processing means for providing reconstruction, demodulation and control means for selecting weighing factors, as disclosed above. For the proper understanding of the present invention, no further details need to be provided here.

The present invention can be used with several types of radio communication systems, and is not restricted to the preferred embodiment disclosed above, Persons skilled in the art may modify, enhance or replace parts of the steps and means of the invention, without departing from the inventive spirit thereof, as disclosed above. All these modifications, enhancements and replacements are construed to be incorporated by the appended claims.

The invention claimed is:

1. A method of interference cancellation in radio communication signals received by a radio access unit of a radio communication system, said radio access unit comprising receiver means and antenna means, said antenna means having a plurality of directionally separated antenna elements for adaptively receiving radio communication signals transmitted by a plurality of remote mobile radio communication units, said method comprising the steps of:
  a) obtaining radio signals received by each of said antenna elements;
  b) determining first weighing factors for optimally selecting radio signals of a first mobile radio communication unit among said radio signals obtained in step a);
  c) weighing said radio signals obtained in step a) by said first weighing factors providing a first radio signal of said first radio communication unit;
  d) determining second weighing factors for optimally selecting radio signals of a second mobile radio communication unit among said radio signals obtained in step a);
  e) weighing said radio signals obtained in step a) by said second weighing factors providing a second radio signal of said second radio communication unit;
  f) subtracting from said second radio signal provided in step e) said first radio signal provided in step c) weighed by said second weighing factors, providing a corrected second radio signal, and
  g) repeating steps d) to f) for a further mobile radio communication unit by determining further weighing factors, providing a further radio signal of said further radio communication unit and providing a corrected further radio signal by each time subtracting from said further radio signal said previously obtained corrected radio signals weighed by said further weighing factors by reconstructing the first and second radio signals and accumulating the reconstructed first and second radio signals which reduces interference to the further radio signal from the first and second radio signals, till a stop criterion has been satisfied.

2. The method according to claim 1, wherein said weighing factors are obtained by forming conceptual antenna patterns with said plurality of directionally separated antenna elements.

3. The method according to claim 2, wherein said weighing factors are selected for optimally selecting radio signals of a respective radio communication unit and for optimally suppressing radio signals corresponding to any other radio communication unit.

4. The method according to claim 3, wherein said criterion includes stopping of step g) once a corrected radio signal has been provided corresponding to a radio communication unit of interest.

5. The method according to claim 1, wherein said radio signals obtained in step a) are ordered from strongest to weakest according to receive signal strength, and wherein said first, second and further radio communication units are selected in descending order of receive signal strength.

6. The method according to claim 1, wherein said first, second and further corrected radio signals are demodulated into first, second and further demodulated signals, respectively, and stored in storage means, and wherein for providing said corrected radio signals said demodulated signals are reconstructed into corresponding radio signals.

7. The method according to claim 1, wherein said stop criterion includes repetition of step g) for said first, second and further radio communication units till said interference cancellation in said first, second and further radio signals between successive repetitions of step g) drops below a set value.

8. The method according to claim 1, wherein said stop criterion includes repetition of step g) for said first, second and further radio communication units during a set time period.

9. The method according to claim 1, wherein said radio signals obtained in step a) are digitized and said steps b) to d) are performed in the digital domain by digital signal processing means.

10. The method according to claim 1, wherein said demodulation and reconstruction are performed in the digital domain by digital signal processing means.

11. A signal processing device for interference cancellation in radio communication signals received by a radio access unit of a radio communication system, said radio access unit comprising receiver means and antenna means, said antenna means having a plurality of directionally separated antenna elements for adaptively receiving radio communication signals transmitted by a plurality of remote mobile radio communication units, said device comprising:
  means for storing radio signals received by each of said antenna elements;
  means for determining respective weighing factors for optimally selecting radio signals of a respective mobile radio communication unit among said stored radio signals;
  means for weighing said stored radio signals by said respective weighing factors for providing a respective radio signal of said respective radio communication unit; and
  means for subtracting from said respective radio signal previously determined corrected radio signals of radio communication units weighed by said respective weighing factors by reconstructing radio signals of any other radio communication units and accumulating the reconstructed radio signals of any other radio communication units, for providing a corrected respective radio signal which reduces interference to the respective radio signal from the radio signals of any other radio communication units.

12. The device according to claim 11, wherein said means for determining respective weighing factors are arranged for forming conceptual antenna patterns with said plurality of directionally separated antenna elements.

13. The device according to claim 11, wherein said means for determining said respective weighing factors are arranged for optimally selecting radio signals of a respective radio communication unit and for optimally suppressing radio signals corresponding to any other radio communication unit.

14. The device according to claim 11, further comprising means for measuring signal strength of said stored radio signals, and means for ordering stored radio signals from strongest to weakest according to receive signal strength, and control means for processing said ordered radio signals in descending order of receive signal strength.

15. The device according to claim 11, comprising
means for demodulating said respective corrected radio signals,
further means for storing said demodulated signals, and
means for reconstructing said demodulated signals providing corrected radio signals for weighing by said weighing means.

16. The device according to claim 15, wherein said demodulation means and reconstruction means are implemented in the digital domain by digital signal processing means.

17. The device according to claim 11, comprising
means arranged for stopping signal processing in accordance with a stopping criterion including any of stopping said signal processing:

once a corrected radio signal corresponding to a radio communication unit of interest has been provided until said interference cancellation, between successive repetitions of providing a corrected respective radio signal, said signal processing drops below a set value, or after a set time period lapses.

18. The device according to claim 11, comprising
analog to digital conversion means for digitizing said stored radio signals, wherein said processing means are digital signal processing means.

* * * * *

UNITED STATES PATENT AND TRADEMARK OFFICE
CERTIFICATE OF CORRECTION

PATENT NO. : 7,650,116 B2  Page 1 of 1
APPLICATION NO. : 10/595564
DATED : January 19, 2010
INVENTOR(S) : Haartsen It is certified that error appears in the above-identified patent and that said Letters Patent is hereby corrected as shown below:

On the Title Page, in Item (56), under "OTHER PUBLICATIONS", in Column 2, Line 7, delete "1.2." and insert -- 1, 2.--, therefor.

On the Title Page, in Item (57), under "ABSTRACT", in Column 2, Line 3, delete "K=" and insert -- k= --, therefor.

On the Title Page, in Item (57), under "ABSTRACT", in Column 2, Line 14, delete "($S'_{i-1}$, $S'_{i-1}$," and insert -- ($s'_{i-1}$, $s'_{i-1}$, --, therefor.

On Page 2, in Item (56), under "OTHER PUBLICATIONS", in Column 2, Line 1, delete "Canceler" and insert -- Canceller --, therefor.

On Page 2, in Item (56), under "OTHER PUBLICATIONS", in Column 2, Lines 5-6, delete "paragraphs .001.!. OII.! figures 1. 2." and insert -- paragraphs '001.!, 'OII.! figures 1, 2. --, therefor.

In Column 2, Line 63, delete "signal," and insert -- signal; --, therefor.

In Column 9, Line 37, in Claim 1, delete "signal," and insert -- signal; --, therefor.

Signed and Sealed this

Fifth Day of October, 2010

David J. Kappos
*Director of the United States Patent and Trademark Office*